United States Patent
Ryba et al.

(10) Patent No.: US 8,459,319 B2
(45) Date of Patent: Jun. 11, 2013

(54) TIRE WITH RUBBER TREAD CONTAINING COMBINATION OF RESIN BLEND AND FUNCTIONALIZED ELASTOMER

(75) Inventors: Jennifer Lyn Ryba, Wadsworth, OH (US); Paul Harry Sandstrom, Cuyahoga Falls, OH (US); Steven Wayne Cronin, Akron, OH (US); Bret Herbert Marts, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 811 days.

(21) Appl. No.: 12/550,738

(22) Filed: Aug. 31, 2009

(65) Prior Publication Data
US 2011/0048599 A1 Mar. 3, 2011

(51) Int. Cl.
*B60C 1/00* (2006.01)
*B60C 11/00* (2006.01)

(52) U.S. Cl.
USPC ........ 152/209.1; 524/492; 524/495; 524/496; 525/236; 525/237

(58) Field of Classification Search
USPC ........ 152/209.1; 524/492, 495, 496; 525/236, 525/237
See application file for complete search history.

(56) References Cited

U.S. PATENT DOCUMENTS

| | | | |
|---|---|---|---|
| 5,219,944 A * | 6/1993 | Scriver et al. | 525/237 |
| 5,681,886 A * | 10/1997 | Fuchs et al. | 525/237 |
| 5,723,530 A | 3/1998 | Zanzig et al. | 524/495 |
| 6,221,953 B1 | 4/2001 | Sandstrom et al. | 524/518 |
| 6,221,990 B1 | 4/2001 | Blok et al. | 526/283 |
| 6,242,550 B1 | 6/2001 | Kralevich, Jr. et al. | 526/283 |
| 6,274,685 B2 | 8/2001 | Blok et al. | 526/283 |
| 6,316,567 B1 | 11/2001 | Kralevich, Jr. et al. | 526/283 |
| 6,357,499 B1 | 3/2002 | Kralevich, Jr. et al. | 152/209.1 |
| 6,465,560 B1 | 10/2002 | Zanzig et al. | 524/495 |
| 6,787,595 B1 * | 9/2004 | Yamada et al. | 524/495 |
| 7,259,205 B1 * | 8/2007 | Pagliarini et al. | 152/209.1 |
| 2005/0211351 A1 * | 9/2005 | Majumdar et al. | 152/209.6 |
| 2005/0234182 A1 * | 10/2005 | Kunisawa | 524/496 |
| 2007/0175557 A1 * | 8/2007 | Puhala et al. | 152/209.5 |
| 2008/0027162 A1 * | 1/2008 | Hua et al. | 524/262 |
| 2010/0186859 A1 * | 7/2010 | Zhao et al. | 152/209.5 |

FOREIGN PATENT DOCUMENTS

| | | |
|---|---|---|
| EP | 1035164 | 2/2000 |
| EP | 1400560 | 9/2003 |
| EP | 1559586 | 1/2005 |
| EP | 1640183 | 9/2005 |
| EP | 1911797 | 4/2008 |
| JP | 08-176348 A * | 7/1996 |

OTHER PUBLICATIONS

Machine translation for Japan 08-176348 (no date).*
Mark et al, Science and Technology of Rubber, pp. 432-437, 1994.*
European Search Report completed Nov. 18, 2010.

* cited by examiner

*Primary Examiner* — Steven D Maki
(74) *Attorney, Agent, or Firm* — Henry C. Young, Jr.

(57) ABSTRACT

This invention relates to a pneumatic tire with an outer, running surface containing, circumferential tread comprised of a styrene/butadiene (SBR) rich rubber composition containing two SBR's with spaced apart glass transition temperatures (Tg's), one of which is a functionalized SBR with a functional group reactive with hydroxyl groups on a precipitated silica, together with a combination of at least three resins with spaced apart softening points. The filler reinforcement is a combination of precipitated silica and specialized rubber reinforcing carbon black.

4 Claims, No Drawings

TIRE WITH RUBBER TREAD CONTAINING COMBINATION OF RESIN BLEND AND FUNCTIONALIZED ELASTOMER

FIELD OF THE INVENTION

This invention relates to a pneumatic tire with an outer, running surface containing, circumferential tread comprised of a styrene/butadiene (SBR) rich rubber composition containing two SBR's with spaced apart glass transition temperatures (Tg's), one of which is a functionalized SBR with a functional group reactive with hydroxyl groups on a precipitated silica, together with a combination of at least three resins with spaced apart softening points. The filler reinforcement is a combination of precipitated silica and specialized rubber reinforcing carbon black.

BACKGROUND OF THE INVENTION

High performance pneumatic rubber tires typically contain rubber treads where traction on the road (skid resistance) is desired.

Such tire treads may contain one or more resins to aid in promoting tread traction.

While the traction enhancement by the resin content may be due to various factors, the melting point (or softening point) of the resin is normally considered important because, as the resin melts and therefore softens, it undergoes a phase transition and its mechanical properties change.

The softening of the resin in the tread rubber composition is seen as promoting a degree of softening of the tread rubber composition and tends to increase the hysteresis of the tread rubber composition, and thereby promote traction of the tread running surface on the road, usually at a rubber temperature substantially equivalent to or slightly above the resin's melting point.

Accordingly, a resin with a lower softening point (melting point) may be desirable as the tire is run from a stationary, resting position to vehicular driving speeds where the temperature of the tread may increase from its stationary ambient temperature (e.g. 23° C.) to a somewhat higher operating temperature.

In such circumstance, a resin with a melting point of about 30° C. might be expected to soften and promote a very hysteretic (predictive internal heat generating) rubber composition at a tread temperature of about 30° C. to about 50° C. and, therefore aid in promoting tire tread traction at such tread temperature.

Thereafter, as the tread temperature increases significantly higher to, for example, 100° C., for example, such resin would be expected to be in a softened or perhaps liquid state and the tread traction would, accordingly, be expected to be affected only to a very limited degree by the aforesaid 30° C. melting point resin as the rubber temperature increases to temperatures significantly higher than 30° C.

Accordingly, the presence in the tread rubber composition of a resin with a considerably higher melting point would be desirable to promote tread traction at the higher tread temperature associated with the higher vehicular speed.

It is apparent that as the resin softens, the cured tread rubber composition containing the softened resin becomes more hysteretic as a result of the softened resin, and therefore predicatively more prone to internal heat generation within the rubber composition. This means that, as the tire tread is being run at higher speeds, the tread rubber composition has a greater tendency to transform internal energy generated within the tread into heat, and results in a significant temperature increase of the rubber composition and a resultant improved traction performance for the tread.

Representative examples of resins which have heretofore been proposed to promote tire tread traction for tread rubber compositions are, for example, hydrocarbon-derived synthetic resins, coumarone-indene resins, rosin, rosin derivatives, dicyclopentadiene based resins such as, for example, dicyclopentadiene/diene resins and polyester phthalate resins.

A significant aspect of this invention is an inventive implementation of a combination of spaced apart melting point (softening point) resins, solution polymerization prepared spaced apart high Tg, high styrene-containing styrene/butadiene elastomers (SBR's) where at least one of such SBR's is a functionalized SBR and reinforcing filler composed of a combination of rubber reinforcing carbon black and precipitated silica, to promote tread traction and a degree of resistance to tread wear over a broad range of operating temperatures.

It is envisioned that the discovery of the beneficial combination of resins, SBR's and carbon black/silica reinforcement provides a significant departure from past practice and enables a high performance tire tread with enhanced traction and handling capability.

In particular a significant contribution of the combination of resins with spaced apart softening points is seen to promote a hysteretic property of the rubber composition over a broad temperature range to thereby promote internal dynamic heat generation within the rubber composition to consequently promote an increase of the rubber temperature of the tire tread itself to thereby promote enhanced traction of the tread over ground over a broad tire tread operating temperature range.

In particular, a significant contribution of the high styrene content of the SBR elastomers is envisioned to promote traction of the tire tread over ground over a broad tire tread operating temperature range.

In particular, a significant contribution of the functionality such SBR(s) is envisioned to promote stability of the elastomer and reinforcing filler network as well as to promote overall durability of the tread, particularly resistance to treadwear.

In particular, a significant contribution of use of a combination of selective carbon black reinforcement together with precipitated silica plus silica coupling agent reinforcement is envisioned to promote a combination of the silica reinforcement effect on wet traction for the tread running surface and of the selective carbon black on treadwear resistance.

A beneficial collective effect is envisioned to promote a maintenance of the resistance to treadwear while achieving traction for the tread running surface.

The carbon black reinforcement is represented by rubber reinforcing carbon black selected for high structure and fine particle size. In particular, the high DBP value for the selected carbon black is indicative of a high structure for the carbon black which is envisioned to promote stability and durability for the tread rubber composition. In particular, the high Iodine value for the selected carbon black is indicative of a fine carbon black particle size which is envisioned to promote traction for the tread running surface and resistance to treadwear for the rubber tire tread.

Historically, it is appreciated that tire treads have heretofore been proposed which rely upon a plurality of resins with spaced apart softening points to promote tread traction (for example see U.S. Pat. Nos. 6,221,990; 6,221,953; 6,242,550; 6,274,685; 6,316,567; and 6,357,499). However, this invention is considered herein to be a significant departure from such practice particularly because of the inclusion of a combination of relatively high styrene containing SBR elastomers with spaced apart Tg's, at least one of which is further required to be a functionalized SBR, as well as reinforcing filler composed of specialized selection of rubber reinforcing carbon black together with precipitated silica and its silica coupling agent.

Historically, it is appreciated that tire treads have heretofore been proposed with various elastomers having spaced apart Tg's for various purposes such as example, U.S. Pat. Nos. 6,465,560 and 5,723,530. However, this invention is considered herein to be a significant departure from such practice particularly because a combination of relatively high styrene containing SBR elastomers is required with spaced apart Tg's, at least one of which is further required to be a functionalized SBR, all of which is required to be used in a tire tread rubber composition which contains at least three resins with spaced apart softening points together with reinforcing filler composed of specialized selection of rubber reinforcing carbon black together with precipitated silica and its silica coupling agent.

In the description of this invention, the terms "rubber compound", "sulfur-cured rubber compound" or "rubber composition", "rubber blend" and "compounded rubber" may be interchangeably used to refer to rubber which has been mixed with rubber compounding ingredients. Such terms are well known to those having skill in such art. The term "phr" is used to refer to parts by weight per 100 parts by weight rubber, as is a conventional practice.

A reference to glass transition temperature of an elastomer, or Tg, as referred to herein, as well as a reference to a resin's melting point, represents an inflection point glass transition temperature of the respective elastomer determined by a differential scanning calorimeter (DSC) at a temperature rate of 110° C. per minute by convention procedure well known to those having skill in such art.

A reference to a resin's softening point as referred to herein relates to its softening point determinable by ASTM E28-58T, sometimes referred to as a "Ring and Ball" softening point.

DISCLOSURE AND PRACTICE OF INVENTION

In accordance with this invention, a pneumatic tire is provided having an outer circumferential tread with a tread running surface where said tread is a sulfur-cured rubber composition comprised of, based on parts by weight per 100 parts by weight rubber (phr),
(A) conjugated diene-based elastomers comprised of:
  (1) about 30 to about 70, alternately from about 40 to about 60, phr of a solution polymerization derived styrene/butadiene elastomer (S-SBR) having a styrene content in a range of from about 35 to about 45 percent and vinyl content in a range of from about 20 to about 40 percent based upon the polybutadiene portion of the elastomer, and a Tg in a range of from about −15° C. to about −22° C., and
  (2) about 30 to about 70, alternately from about 40 to about 60, phr of a functionalized solution polymerization derived styrene/butadiene elastomer (S-SBR-F) having a styrene content in a range of from about 35 to about 45 percent and a vinyl content in a range of from about 20 to about 40 percent based upon the polybutadiene portion of the elastomer, and a Tg in a range of from about −28° C. to about −40° C.;
wherein said Tg of said S-SBR and said S-SBR-F are spaced apart by at least 10° C.;
wherein said functionalized SBR-F contains functional group(s) comprised of at least one of:
  (a) amine functional group reactive with hydroxyl groups contained on a precipitated silica filler rubber reinforcement (referred to herein as an amine functionalized SBR), or
  (b) siloxy functional group reactive with hydroxyl groups contained on a precipitated silica filler rubber reinforcement (for example, alkoxy silane group as —Si(OR)$_3$), (referred to herein as a siloxy functionalized SBR);
  (c) combination of amine and siloxy functional groups with the siloxy group being reactive with hydroxyl groups contained on a precipitated silica filler rubber reinforcement;
  (d) silane/thiol functional groups (silane/thiol functionalized SBR);
  (e) hydroxyl functional groups reactive with hydroxyl groups contained on a precipitated silica filler rubber reinforcement (referred to herein as a hydroxyl functionalized SBR); and
  (f) epoxy groups reactive with hydroxyl groups contained on a precipitated silica filler rubber reinforcement (referred to herein as an epoxy functionalized SBR);
(B) from about 8 to about 30 phr of at least three resins, desirably four resins, each resin being present in an amount of at least about 0.5, alternately at least 1 and alternately in a range of from about 0.5 to about 10, phr selected from:
  (1) polyester terephthalate resin, having a melting point in a range of from about 20° C. to about 26° C.,
  (2) styrene/alphamethyl styrene resin, having a melting point in a range of from about 80° C. to about 90° C.,
  (3) gum rosin, having a melting point in a range of from about 50° C. to about 70° C., desirably about 60° C., and
  (4) coumarone indene resin, having a melting point in a range of from about 90° C. to about 120° C.;
(C) about 70 to about 100 phr of rubber reinforcing filler comprised of:
  (1) rubber reinforcing carbon black in a range of from about 20 to about 90 phr having a DBP (dibutyl phthalate) absorption value (ASTM D 2414) of at least 140 cc/100 g, alternately in a range of from 140 to about 180 cc/100 g in combination with an Iodine value (ASTM D 1510) of at least 200 g/kg, alternately in a range of from 200 to 240 g/kg, and
  (2) precipitated silica in a range of from about 10 to about 50 phr,
wherein the weight ratio of said rubber reinforcing carbon black to said precipitated silica is at least 2/1, and
(D) silica coupling agent for said precipitated silica having a moiety (e.g. a siloxy moiety) reactive with hydroxyl groups (e.g. silanol groups) on said precipitated silica and another different moiety interactive with said elastomers.

The amount of each prescribed resin, as heretofore indicated, is desirably at least 0.5 phr, and alternately at least 1 phr, for example a range of from about 0.5 to about 10 phr, with a total of the resins being in a range of from about 8 to about 30 phr in the rubber composition in order that the resins may reasonably affect the hysteresis of the rubber composition as evidenced by its tan delta viscoelastic property 30° C. to 150° C. temperature range and therefore contribute to the tread rubber hysteresis and hence the tread traction.

It is generally desired that all four of the indicated resins be present in the rubber composition. However, if desired, three of the four resins may be present. If three of said resins are to be used, it is considered that a desirable combination of the three resins is:

(A) polyester terephthalate resin, having a melting point in a range of from about 20° C. to about 26° C., (B) gum rosin, having a melting point in a range of from about 50° C. to about 70° C., desirably about 60° C., and (C) coumarone indene resin, having a melting point in a range of from about 90° C. to about 120° C.;

or a desirable combination of the three resins as:

(D) polyester terephthalate resin, having a melting point in a range of from about 20° C. to about 26° C., (E) styrene/alphamethyl styrene resin, having a melting point in a range of from about 80° C. to about 90° C., and (F) gum rosin, having a melting point in a range of from about 50° C. to about 70° C., desirably about 60° C.

By tread traction it is meant contribution of the tread to resistance to skidding on a road surface as well as contribution of the tread to tire handling, grip and cornering performance.

The synthetic, amorphous silica (e.g. rubber reinforcing precipitated silica), may, in general, be prepared by a controlled acidification of a soluble silicate, e.g., sodium silicate. Such precipitated silicas used for reinforcement of rubber are well known to those having skill in such art.

Such precipitated silicas might have, for example, a BET surface area, as measured using nitrogen gas, in a range, for example, of about 40 to about 600, and more usually in a range of about 50 to about 300, square meters per gram. A BET method of measuring surface area is described, for example, in the *Journal of the American Chemical Society*, Volume 60, understood to include Page 308 in the year 1938.

The silica may also have, for example, a dibutylphthalate (DBP) absorption value in a range of about 100 to about 350, and more usually about 150 to about 300 cc/100 gm.

Various commercially available silicas may be used, for example, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165 MP, silicas available from Degussa GmbH with, for example, designations VN2 and VN3, etc and silicas commercially available from Huber having, for example, a designation of Hubersil 8745.

In practice, the coupling agent for the precipitated silica reinforcement may be, for example, comprised of an alkoxysilyl polysulfide such as for example, a bis(3-trialkoxysilylalkyl) polysulfide containing an average of from about 2 to about 4, alternately from about 2 to 2.6 or alternately from about 3.4 to about 3.8, connecting sulfur atoms in its polysulfidic bridge.

Alkyl radicals for said alkoxy groups may be comprised of at least one ethyl radical. The alkyl radical may be comprised of, for example butyl, propyl and amyl radicals, preferably a propyl radical.

Representative of such bis(3-trialkoxysilylalkyl) polysulfide coupling is comprised of a bis(3-triethoxysilylpropyl) polysulfide.

Alternatively, said coupling agent may be an alkoxyorganomercaptosilane.

Such coupling agent may, for example, be added directly to the elastomer mixture or may be added as a composite of precipitated silica and such coupling agent formed by treating a precipitated silica therewith.

It should readily be understood by one having skill in the art that the rubber composition of the tire tread may be compounded by methods generally known in the rubber compounding art, such as mixing the various sulfur-vulcanizable constituent rubbers, namely the aforesaid SBR and functionalized S-SBR-F elastomers, with various additive materials such as, for example, curing aids, such as sulfur, activators, retarders and accelerators, processing additives, such as oils, the aforesaid plurality of resins, precipitated silica with coupling agent and rubber reinforcing carbon black reinforcing fillers, and plasticizers, fillers, pigments, stearic acid, zinc oxide, waxes, antioxidants and antiozonants, and peptizing agents, where appropriate.

The sulfur vulcanization of the rubber composition is conducted in the presence of a sulfur-vulcanizing agent. Examples of suitable sulfur-vulcanizing agents may include, as may be appropriate, elemental sulfur (free sulfur) or sulfur-donating vulcanizing agents, for example, an amine disulfide, polymeric polysulfide or sulfur olefin adducts. Usually, the sulfur-vulcanizing agent is likely to be elemental sulfur. As known to those skilled in the art, sulfur-vulcanizing agents may be used, where appropriate, in an amount, for example, ranging from about 0.5 to about 8 phr, alternately in a range from about 1.5 to about 2.25 phr.

Sulfur vulcanization accelerators and retarders, where appropriate, are typically used to control the time and/or temperature required for vulcanization and to improve the properties of the vulcanizate. For example, in one embodiment, a single accelerator system may be used, i.e., primary accelerator. Conventionally, a primary accelerator where used, is used, for example, in amounts ranging from about 0.5 to about 2.0 phr. In another embodiment, combinations of two or more accelerators in which a primary accelerator may be used, where appropriate, generally in the larger amounts (0.5 to 1.0 phr), with a secondary accelerator, generally in smaller amounts (0.05-0.50 phr) in order to activate and to improve the properties of the vulcanizate. Combinations of such accelerators have historically been observed to produce a synergistic effect of the final properties of sulfur-cured rubbers and are often somewhat better than those produced by use of either accelerator alone. In addition, delayed action accelerators may be used, where appropriate, which are usually less affected by normal processing temperatures but produce satisfactory cures at ordinary vulcanization temperatures. Representative examples of accelerators may include, for example, and where appropriate, amines, disulfides, guanidines, thioureas, thiazoles, thiurams, sulfenamides, dithiocarbamates and xanthates. Often, the primary accelerator may be a sulfenamide. If a second accelerator is used, the secondary accelerator may be, for example, a guanidine, dithiocarbamate or thiuram compound.

The tire can be built, shaped, molded and cured by various methods which will be readily apparent to those having skill in the art.

The practice of this invention is further illustrated by reference to the following examples which are intended to be representative rather than restrictive of the scope of the invention. Unless otherwise indicated, all parts and percentages are by weight.

EXAMPLE I

Rubber compositions were prepared for evaluating various resins for use in the invention. For Experimental rubber Compound B, four resins were used with appropriate softening points according to the following recipe of Table 1.

TABLE 1

| | Parts | |
|---|---|---|
| | Control Compound A | Experimental Compound B |
| Non-productive mixing step (NP1) to about 160° C. | | |
| E-SBR rubber[1] with Tg of about −33° C. | 90 | 0 |
| Cis 1,4-polybutadiene rubber[2] with Tg of about −105° C. | 10 | 0 |
| S-SBR-F[3] rubber with Tg of about −34° C. | 0 | 50 |
| S-SBR-B[4] rubber with Tg of about −19° C. | 0 | 50 |
| Precipitated silica[5] | 38 | 25 |
| Silica coupling agent[6] | 6 | 4 |
| Carbon black A[7] | 64 | 0 |
| SAF carbon black B[8] | 0 | 82 |
| Rubber processing oil, wax and processing aid[9] | 22 | 10.3 |
| Zinc oxide and fatty acid[10] | 5 | 5 |
| Antidegradants | 5 | 5 |
| Resins | | |
| Resin A (polyester terephthalate resin, 23° C.)[11A] | 0 | 5 |
| Resin B (styrene/alphamethylstyrene resin, 85° C.)[11B] | 8 | 3 |
| Resin C (gum rosin acid resin, 60° C.)[11C] | 0 | 5 |
| Resin D (coumarone indene resin, 105° C.)[11D] | 0 | 3 |
| Productive Mixing Step (PR) to about 110° C. | | |
| Sulfur | 2 | 2 |
| Accelerators A[12] | 4 | 0 |
| Accelerators B[13] | 0 | 2 |

[1]Emulsion polymerization prepared styrene/butadiene elastomer having a Tg of about −33° C. and containing about 40 percent bound styrene from The Goodyear Tire & Rubber Company; an oil extended elastomer containing 37.5 parts by weight of rubber processing oil per 100 parts by weight of the elastomer and reported in the Table in terms of parts by weight of the elastomer.
[2]Cis 1,4-polybutadiene rubber as BUD1207 ™ from The Goodyear Tire & Rubber Company
[3]Methoxysilane functionalized solution polymerization prepared styrene/butadiene elastomer (referred to herein as "SBR-F") having a Tg of about −34° C. and containing about 40 percent bound styrene as SE SLR4630 ™ from the Dow Chemical company; an oil extended elastomer oil containing 37.5 parts by weight of rubber processing oil per 100 parts by weight of the elastomer and reported in the Table in terms of parts by weight of the elastomer.
[4]Solution polymerization prepared styrene/butadiene elastomer having a Tg of about −19° C. and containing about 40 percent bound styrene as NTR SE8259 ™ from the Sumitomo Chemical Company; the elastomer being oil extended by containing 37.5 parts by weight of rubber processing oil per 100 parts by weight of the elastomer and reported in the Table in terms of parts by weight of the elastomer.
[5]Precipitated silica as Zeosil ™ 1165 MP from Rhodia
[6]Silica coupling agent as a composite of Si266 ™ coupling agent on carbon black in a 50/50 weight ratio thereof from Degussa Evonic, comprised of bis(3-triethoxysilylpropyl) polysulfide containing a range of from about 2.2 to about 2.6 sulfur atoms in its polysulfidic bridge and reported in the Table as the composite.
[7]Rubber reinforcing carbon black as N120, an ASTM designation, having a reported DBP absorption value (ASTM D 2414) of about 115 cc/100 g and an Iodine value (ASTM D1510) of about 121 g/kg
[8]Rubber reinforcing carbon black as SAF, or Super Abrasion Furnace, carbon black having a reported DBP absorption value (ASTM D2414) of about 145 cc/100 g and an Iodine value (ASTM D1510) of about 215 g/kg
[9]Rubber processing oil, microcrystalline and paraffinic wax and 2 phr of processing aid as EF44 ™ from Struktol
[10]Fatty acid comprised of stearic, palmitic and oleic acids
[11A]Resin A, a polyester terephthalate resin having a reported melting point of about 23° C., as Plastall P900 ™ from the Ester Solution
[11B]Resin B, a styrene/alpha methylstyrene resin having a reported melting point of about 85° C., as Eastman Resin 2336 ™ from Eastman Chemical
[11C]Resin C, a gum rosin acid resin having a melting point of about 60° C.
[11D]Resin D, a coumarone indene resin having a reported softening point of about 105° C., as Cumar R-13 ™ from Neville Chemical.
[12]Sulfur cure accelerators as sulfenamide and tetremethylthiuamdisulfide
[13]Sulfur cure accelerators as sulfonamide and diphenylguanidine The blend is prepared by first mixing the non-productive (NP1) in an internal rubber mixer followed by mixing the mixture in a productive mixing step (PR) in which curatives are added.

The prepared rubber Samples of Example I were cured at a temperature of about 160° C. for about 14 minutes and various physical properties reported in Table 2.

TABLE 2

| | Control Compound A | Experimental Compound B |
|---|---|---|
| Resins (phr) and approximate Melting Points (° C.) | | |
| Resin A-Polyester terephthalate resin, 23° C. | 0 | 5 |
| Resin B-Styrene/alphamethylstyrene resin, 85° C. | 8 | 3 |
| Resin C-Gum rosin acid resin, 60° C. | 0 | 5 |
| Resin D-Coumerone Indene resin, 105° C. | 0 | 3 |
| Elastomers (phr) and approximate Tg (° C.) | | |
| E-SBR (−33° C.) | 90 | 0 |
| Cis 1,4-polybutadiene (−105° C.) | 10 | 0 |
| S-SBR - F (−34° C.) | 0 | 50 |
| S-SBR - B (−19° C.) | 0 | 50 |
| Reinforcing Filler (phr) | | |
| Carbon black - A (DBP = 115, Iodine = 121) | 64 | 0 |
| SAF Carbon black - B (DBP = 145, Iodine = 215) | 0 | 82 |
| Precipitated silica | 38 | 25 |
| Silica coupling agent | 6 | 4 |
| Physical Properties | | |
| Tread wet traction and handling promotion property, Tan Delta[1] at 0° C., 0.1% strain and 11 Hertz | 0.313 | 0.839 |
| Tire Handling Promotion Properties | | |
| Storage modulus (G')[2] at 10 percent strain (MPa) | 1141 | 1589 |
| 300% modulus, ring[2] (MPa) | 8.3 | 7.0 |
| Shore A hardness, 100° C. | 56 | 59 |
| Tire Rolling Resistance Reduction Promoting Property | | |
| Hot Rebound (100° C.) | 43 | 30 |
| Tan Delta[2] at 100° C. | 0.259 | 0.339 |
| Tread Wear Resistance Promoting Property | | |
| DIN Abrasion resistance, relative[3] | 214 | 220 |
| Tear strength peal adhesion to self[4] (Newtons, N) | 115 | 75 |

[1]Samples of cured rubber blends were tested by an Rheometrics RSA III analytical instrument to determine, or measure, the tan delta at 0° C., 0.1 percent strain and 11 Hertz frequency. The objective was to measure and report in the Table the viscoelastic response to an applied deformation of a cured rubber sample under tension at a specified very low strain, namely at a 0.1 percent strain, and at a low temperature of 0° C. The tan delta is a measure of a compound's viscoelastic character which has been observed to relate to tire tread performance. The tan delta versus temperature characterization of rubbers is well known to those having skill in such art with the value at 0° C. being reported in the Table.
[2]Storage modulus (G') and tan delta at 100° C. by Rubber Process Analyzer, RPA 3300 percent modulus by Automated Test System, ATS
[3]DIN abrasion test as ASTM D53516
[4]Peal adhesion test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

From Table 2 it is seen that Experimental rubber Compound B has a significantly higher tan delta (0° C.) value of 0.839 as compared to a significantly lower value of 0.313 for Control rubber Compound A which is predictive of a considerably better wet traction for a tire tread of rubber Compound B, namely better wet stopping and better handling.

Further, it is seen that Experimental rubber Compound B presented a combination of low strain (at 10 percent strain) storage modulus (G') of 1589 MPa and Shore A hardness (100° C.) of 59 as compared to Control rubber Compound A having a lower storage modulus G' of 1481 and lower Shore A hardness of 56 for Control rubber Compound A which is predictive of better dry handling for a tire tread of rubber Compound B.

It is additionally seen that Experimental rubber Compound B had a DIN abrasion resistance of 220 which is substantially equivalent to the DIN abrasion value of 214 for Control rubber Compound A which is predictive of substantially equivalent tread wear resistance for a tire tread of such rubber compounds.

It is therefore concluded that an unexpected and significant discovery is presented by this Example in a sense that the aforesaid improvement in predictive wet traction and wet and dry handling properties are achieved while substantially maintaining the resistance to predictive treadwear for a tire tread.

Such achievement is concluded as being a result of providing a rubber composition for a tire tread comprised of a styrene/butadiene (SBR) rich rubber composition containing two SBR's with spaced apart glass transition temperatures (Tg's), one of which is a functionalized SBR with a functional group reactive with hydroxyl groups on a precipitated silica, together with a combination of at least three resins, four resins for this Example for rubber Composition B, with spaced apart softening points. The filler reinforcement is a combination of precipitated silica and specialized rubber reinforcing carbon black.

EXAMPLE II

A tire of size P245/45R18 was prepared with a high performance circumferential tread of a rubber composition representative of and similar, with only minor adjustments, to Experimental rubber Composition B of Example I (Experimental Tire) and compared to a tire with a more conventional high performance circumferential tread (Control Tire) of a rubber composition representative of and similar, with only minor adjustments, to Control rubber Composition B of Example I.

The results were normalized to a value of 100 for the Control Tire.

The tires were individually tested for dry stopping distance (stopping distance on dry road pavement surface); dry handling (cornering, etc on a dry road pavement surface), wet traction (stopping distance on dry road pavement surface) and treadwear (resistance to treadwear) as well as rolling resistance (resistance to rolling of the tire for which a higher value is indicative of lower rolling resistance).

The results are summarized in the following Table 3.

TABLE 3

| Property | Control Tire | Experimental Tire |
| --- | --- | --- |
| Dry Stopping | 100 | 107 |
| Dry Handling | 100 | 111 |
| Wet Traction | 100 | 104 |
| Treadwear | 100 | 98 |
| Rolling Resistance | 100 | 83 |

It is considered that this Example confirms the unexpected and significant discovered combination of improvement in predictive wet traction and wet and dry handling properties achieved while substantially maintaining the resistance to predictive treadwear for a tire tread.

It is considered that this Example confirms that such achievement is concluded as being a result of providing a rubber composition for a tire tread comprised of a styrene/butadiene (SBR) rich rubber composition containing two SBR's with spaced apart glass transition temperatures (Tg's), one of which is a functionalized SBR with a functional group reactive with hydroxyl groups on a precipitated silica, together with a combination of at least three resins with spaced apart softening points. The filler reinforcement is a combination of precipitated silica and specialized rubber reinforcing carbon black.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer circumferential tread with a tread running surface where said tread is a sulfur-cured rubber composition comprised of, based on parts by weight per 100 parts by weight rubber (phr),
   (A) conjugated diene-based elastomers comprised of:
      (1) about 30 to about 70 phr of a solution polymerization derived styrene/butadiene elastomer (S-SBR) having a styrene content in a range of from about 35 to about 45 percent and vinyl content in a range of from about 20 to about 40 percent based upon the polybutadiene portion of the elastomer, and a Tg in a range of from about −15° C. to about −22° C., and
      (2) about 30 to about 70 phr of a functionalized solution polymerization derived styrene/butadiene elastomer (S-SBR-F) having a styrene content in a range of from about 35 to about 45 percent and a vinyl content in a range of from about 20 to about 40 percent based upon the polybutadiene portion of the elastomer, and a Tg in a range of from about −28° C. to about −40° C.;
      wherein said Tg of said S-SBR and said S-SBR-F are spaced apart by at least 10° C.;
      wherein said functionalized SBR-F contains functional group(s) consisting of siloxy groups reactive with hydroxyl groups contained on a precipitated silica filler rubber reinforcement;
   (B) from about 8 to about 30 phr of at least three resins, each resin being present in an amount in a range of from about 0.5 to about 10 phr comprised of at least three resins selected from:
      (1) polyester terephthalate resin, having a melting point in a range of from about 20° C. to about 26° C.,
      (2) styrene/alphamethyl styrene resin, having a melting point in a range of from about 80° C. to about 90° C.,
      (3) gum rosin, having a melting point in a range of from about 50° C. to about 70° C., and
      (4) coumarone indene resin, having a melting point in a range of from about 90° C. to about 120° C.;
   (C) about 70 to about 100 phr of rubber reinforcing filler consisting of a combination of rubber reinforcing carbon black and precipitated silica as:
      (1) rubber reinforcing carbon black in a range of from about 20 to about 90 phr having a DBP (dibutyl phthalate) absorption value (ASTM D 2414) of at least 140 cc/100 g in combination with an Iodine value (ASTM D1510) of at least 200 g/kg, and
      (2) precipitated silica in a range of from about 10 to about 50 phr,
      wherein the weight ratio of said rubber reinforcing carbon black to said precipitated silica is at least 2/1, and
   (D) silica coupling agent for said precipitated silica comprised of a bis(3-triethoxysilylpropyl) polysulfide containing an average of from about 2 to about 4 connecting sulfur atoms in its polysulfidic bridge.

2. Tire of claim 1 wherein said functionalized SBR-F is a methoxysilane functionalized styrene/butadiene elastomer.

3. The tire of claim 1 wherein said coupling agent is comprised of a bis(3-triethoxysilylpropyl) polysulfide containing an average of from about 2 to about 2.5 connecting sulfur atoms in its polysulfidic bridge.

4. Tire of claim 3 said functionalized SBR-F is comprised of a methoxysilane functionalized solution polymerization prepared styrene/butadiene elastomer.

* * * * *